United States Patent
Miyashita et al.

(10) Patent No.: US 11,559,851 B2
(45) Date of Patent: Jan. 24, 2023

(54) LASER MACHINING DEVICE AND LASER MACHINING METHOD

(71) Applicant: FANUC CORPORATION, Yamanashi (JP)

(72) Inventors: Kouichi Miyashita, Yamanashi (JP); Takeshi Mochida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 787 days.

(21) Appl. No.: 15/493,351

(22) Filed: Apr. 21, 2017

(65) Prior Publication Data
US 2017/0304937 A1    Oct. 26, 2017

(30) Foreign Application Priority Data

Apr. 21, 2016 (JP) .............................. JP2016-085185

(51) Int. Cl.
    *B23K 26/02* (2014.01)
    *B23K 26/04* (2014.01)
    *G05B 19/416* (2006.01)
    *B23K 26/08* (2014.01)
    *B23K 26/035* (2014.01)

(52) U.S. Cl.
    CPC ............ *B23K 26/02* (2013.01); *B23K 26/035* (2015.10); *B23K 26/048* (2013.01); *B23K 26/0884* (2013.01); *G05B 19/4163* (2013.01); *G05B 2219/45041* (2013.01)

(58) Field of Classification Search
    CPC ...... B23K 26/02; B23K 26/03; B23K 26/035; B23K 26/048; B23K 26/0884; G05B 19/4163; G05B 2219/45041
    USPC .............................. 219/121.6–121.86, 121.81
    See application file for complete search history.

(56) References Cited

U.S. PATENT DOCUMENTS

| 4,794,222 A | * | 12/1988 | Funayama | ........... B23K 26/048 219/121.74 |
| 5,067,086 A |   | 11/1991 | Yamazaki et al. | |
| 5,272,312 A | * | 12/1993 | Jurca | .................... B23K 26/032 219/121.63 |
| 5,340,962 A | * | 8/1994 | Schmidt | ................. B23K 26/04 219/121.78 |

(Continued)

FOREIGN PATENT DOCUMENTS

| CN | 201015820 Y | 2/2008 |
| DE | 112010000685 T5 | 11/2012 |
| EP | 2275782 A1 | 1/2011 |

(Continued)

*Primary Examiner* — Dana Ross
*Assistant Examiner* — Joseph W Iskra
(74) *Attorney, Agent, or Firm* — Hauptman Ham, LLP (57) ABSTRACT

A unit vector calculating unit of a laser machining device obtains a unit vector based on respective current rotational positions of an A-axis and a B-axis. A movement command calculating unit, a speed command calculating unit, or a torque command calculating unit generates a command signal for maintaining a gap amount at a constant value, based on the unit vector, and the gap amount between a machining nozzle and a workpiece. With a servo control unit, on the basis of the command signal, an X-axis motor, a Y-axis motor, and a Z-axis motor are controlled, whereby the machining nozzle is moved relatively in three-dimensional directions with respect to the workpiece.

8 Claims, 8 Drawing Sheets

(56) References Cited

U.S. PATENT DOCUMENTS 8,716,621 B2     5/2014   Grassi et al.
2002/0068990 A1*   6/2002   Yamazaki .......... G05B 19/4086
                                                                                   700/187

FOREIGN PATENT DOCUMENTS

| JP | H01306091 A | 12/1989 |
|----|-------------|---------|
| JP | H0775982 A | 3/1995 |
| JP | H8-300171 A | 11/1996 |
| JP | 9-164494 A | 6/1997 |
| JP | H10-175085 A | 6/1998 |
| JP | H11-197866 A | 7/1999 |
| JP | 2004174586 A | 6/2004 |
| JP | 5308798 B2 | 10/2013 |

\* cited by examiner

```
O0001
N001 G43.4                          :TOOL CENTER POINT CONTROL ON
N002 G13                             :GAP CONTROL ON
N003 G01X45. Z50. F1000.
N004 G01X45.868 Z49.924 B10.         :NOZZLE TURNING
N005 G01X46.710 Z49.698 B20.         :NOZZLE TURNING
N006 G01X47.450 Z49.330 B30.         :NOZZLE TURNING
N007 G01X48.214 Z48.830 B40.         :NOZZLE TURNING
N008 G01X48.830 Z48.214 B50.         :NOZZLE TURNING
N009 G01X49.330 Z47.500 B60.         :NOZZLE TURNING
N010 G01X49.698 Z46.710 B70.         :NOZZLE TURNING
N011 G01X49.924 Z45.868 B80.         :NOZZLE TURNING
N012 G01X50. Z45. B90.               :NOZZLE TURNING
```

LASER MACHINING DEVICE AND LASER MACHINING METHOD

CROSS-REFERENCE TO RELATED APPLICATION

This application is based upon and claims the benefit of priority from Japanese Patent Application No. 2016-085185 filed on Apr. 21, 2016, the contents of which are incorporated herein by reference.

BACKGROUND OF THE INVENTION

Field of the Invention

The present invention relates to a laser machining device and a laser machining method in which, in accordance with a machining program, a machining nozzle is relatively moved with respect to a workpiece, the machining nozzle is rotated about a predetermined axis of rotation, and laser machining is performed on the workpiece by a laser beam irradiated from the machining nozzle.

Description of the Related Art

Heretofore, in a laser machining device, in accordance with a machining program, laser machining has been performed on a workpiece by relatively moving a machining nozzle with respect to the workpiece while rotating the machining nozzle about a predetermined axis of rotation, and irradiating a laser beam with respect to the workpiece from the machining nozzle. In this case, a gap amount between the machining nozzle and the workpiece is controlled at a predetermined amount by relatively moving the machining nozzle with respect to the workpiece along an axial direction of the machining nozzle.

In Japanese Laid-Open Patent Publication No. 09-164494, in a three-dimensional laser processing machine, it is disclosed that a gap amount between the workpiece and the machining nozzle is detected by a sensor provided in the machining nozzle; on the basis of the detected gap amount, correction amounts in three-dimensional directions of the gap amount are calculated; and by controlling drive motors of respective axes on the basis of the respective correction amounts, the machining nozzle is moved three-dimensionally relative to the workpiece in a state in which the posture of the machining nozzle is maintained.

SUMMARY OF THE INVENTION

However, in the case that laser machining is carried out while moving the machining nozzle along the surface of the workpiece, if the actual position and posture of the machining nozzle is unknown, the machining nozzle cannot be controlled correctly at the constant gap amount.

More specifically, in the case of performing laser machining, if the command value (command position) of the position and posture of the machining nozzle is obtained in accordance with the machining program, and in the case that the position and posture of the machining nozzle is changed on the basis of the obtained command position, due to a control delay, a deviation occurs between the command position and the actual position and posture of the machining nozzle.

For this reason, in order to keep the gap amount constant, a corrected movement amount in three-dimensional directions of the machining nozzle is determined on the basis of the gap amount and the command position, and in accordance with the determined corrected movement amount, when the machining nozzle is moved three-dimensionally with respect to the workpiece, the machining nozzle is moved relatively along the axial direction of the machining nozzle at the command position. More specifically, the machining nozzle moves relatively along a direction which is different from the actual axial direction of the machining nozzle. As a result, it is difficult to control the gap amount between the machining nozzle and the workpiece so as to remain constant. In such a condition, if laser machining is carried out by irradiating the laser beam onto the workpiece from the machining nozzle, an error occurs between the target machined shape and the actual machined shape, and thus, machining accuracy decreases.

The present invention has been devised taking into consideration the aforementioned problems, and has the object of providing a laser machining device and a laser machining method in which, even if a control delay occurs with respect to changes in the position and posture of the machining nozzle, it is possible to correctly control the gap amount to remain constant, and to reduce errors in the machined shape of a workpiece.

The present invention relates to a laser machining device and a laser machining method in which, in accordance with a machining program, a machining nozzle is moved relatively with respect to a workpiece, the machining nozzle is rotated about a predetermined axis of rotation, and laser machining is performed on the workpiece by a laser beam irradiated from the machining nozzle.

In addition, for realizing the aforementioned objects, the laser machining device according to the present invention includes a three-dimensional moving unit configured to relatively move the machining nozzle in three-dimensional directions with respect to the workpiece, a rotating unit configured to rotate the machining nozzle about the axis of rotation, a gap amount detecting unit configured to detect a gap amount between the machining nozzle and the workpiece, a rotational position detecting unit configured to detect a rotational position of the axis of rotation by the rotating unit, and a command calculating unit configured to generate a command signal for maintaining the gap amount at a constant value based on the gap amount and the rotational position. In this case, the three-dimensional moving unit, on the basis of the command signal, relatively moves the machining nozzle in three-dimensional directions with respect to the workpiece.

Further, for realizing the aforementioned objects, the laser machining method includes a first step of detecting, by a gap amount detecting unit, a gap amount between the machining nozzle and the workpiece, a second step of detecting, by a rotational position detecting unit, a rotational position of the axis of rotation as rotated by a rotating unit, a third step of generating, by a command calculating unit, a command signal for maintaining the gap amount at a constant value based on the gap amount and the rotational position, and a fourth step of relatively moving, by a three-dimensional moving unit, the machining nozzle in three-dimensional directions with respect to the workpiece based on the command signal.

In the foregoing manner, according to the present invention, the actual rotational position of the axis of rotation and the actual gap amount are detected, respectively, the command signal is generated based on the detected rotational position and the detected gap amount, and then, on the basis of the generated command signal, the machining nozzle is moved relatively in three-dimensional directions with respect to the workpiece. Consequently, even if a control delay occurs with respect to changes in the position and posture of the machining nozzle, it is possible to correctly control the gap amount to remain constant. As a result, it is possible to reduce errors in the machined shape of workpieces caused by controlling the gap amount.

In this instance, the laser machining device further includes a unit vector calculating unit configured to calculate a unit vector in an axial direction of the machining nozzle based on the rotational position. In this case, the command calculating unit, on the basis of the unit vector and the gap amount, generates the command signal according to a corrected movement amount of the machining nozzle along the axial direction. Consequently, since the machining nozzle can be three-dimensionally moved relatively to the workpiece along the actual axial direction of the machining nozzle, it is possible to correctly control the gap amount.

Further, the rotational position detecting unit preferably is an absolute type rotary encoder configured to output an output signal corresponding to the rotational position. In this case, the laser machining device may further include a rotational position calculating unit configured to calculate a current rotational position of the axis of rotation based on the output signal, and the unit vector calculating unit may calculate the unit vector based on the current rotational position. The absolute type rotary encoder outputs the output signal which is indicative of an absolute position of the rotational position. Consequently, assuming that the current rotational position is calculated on the basis of the output signal, and the unit vector is calculated on the basis of the calculated current rotational position, the corrected movement amount of the machining nozzle along the axial direction can be determined accurately.

The laser machining device may further include a command control unit configured to output, on the basis of the machining program, a command movement amount in three-dimensional directions of the machining nozzle, and to output a command rotational amount of the axis of rotation, and a servo control unit configured to control the three-dimensional moving unit based on the command movement amount, and to control the rotating unit based on the command rotational amount. In this case, the servo control unit corrects the command movement amount using the command signal, and controls the three-dimensional moving unit based on the command movement amount after correction thereof.

Since the command movement amount is corrected by the command signal, and the three-dimensional moving unit is controlled based on the command movement amount after correction thereof, it is possible to reduce any deviation between the command position and the actual position and posture of the machining nozzle caused by a delay in the servo control. Further, since the command movement amount is quickly corrected, and the gap amount can be controlled so as to remain constant, it is possible to increase the speed of the axis of rotation, as well as to improve the cycle time of such laser machining.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a laser machining device and a laser machining method according to the present invention will be presented and described in detail below with reference to the accompanying drawings.

Problems Encountered in the Present Embodiment

Figure 1:
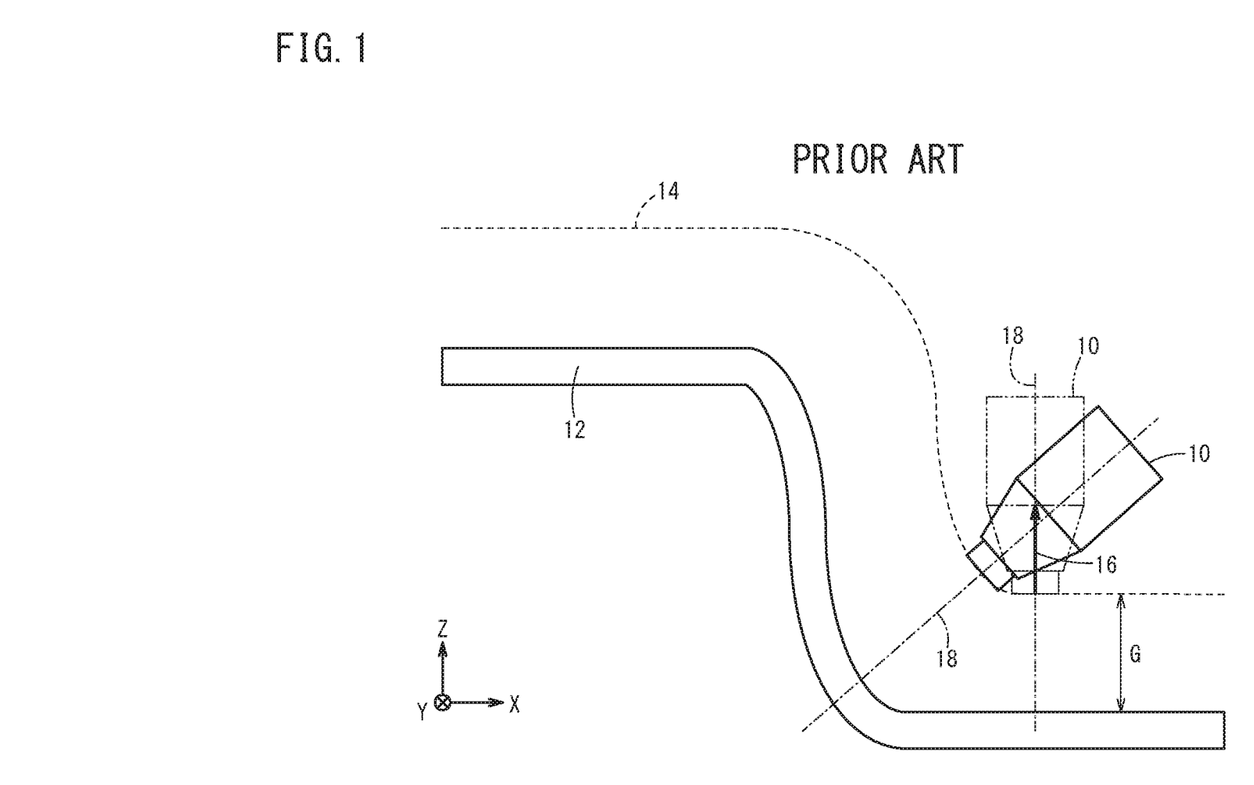
FIG. 1 is an explanatory diagram showing problems encountered in the present embodiment.
Figure 2:
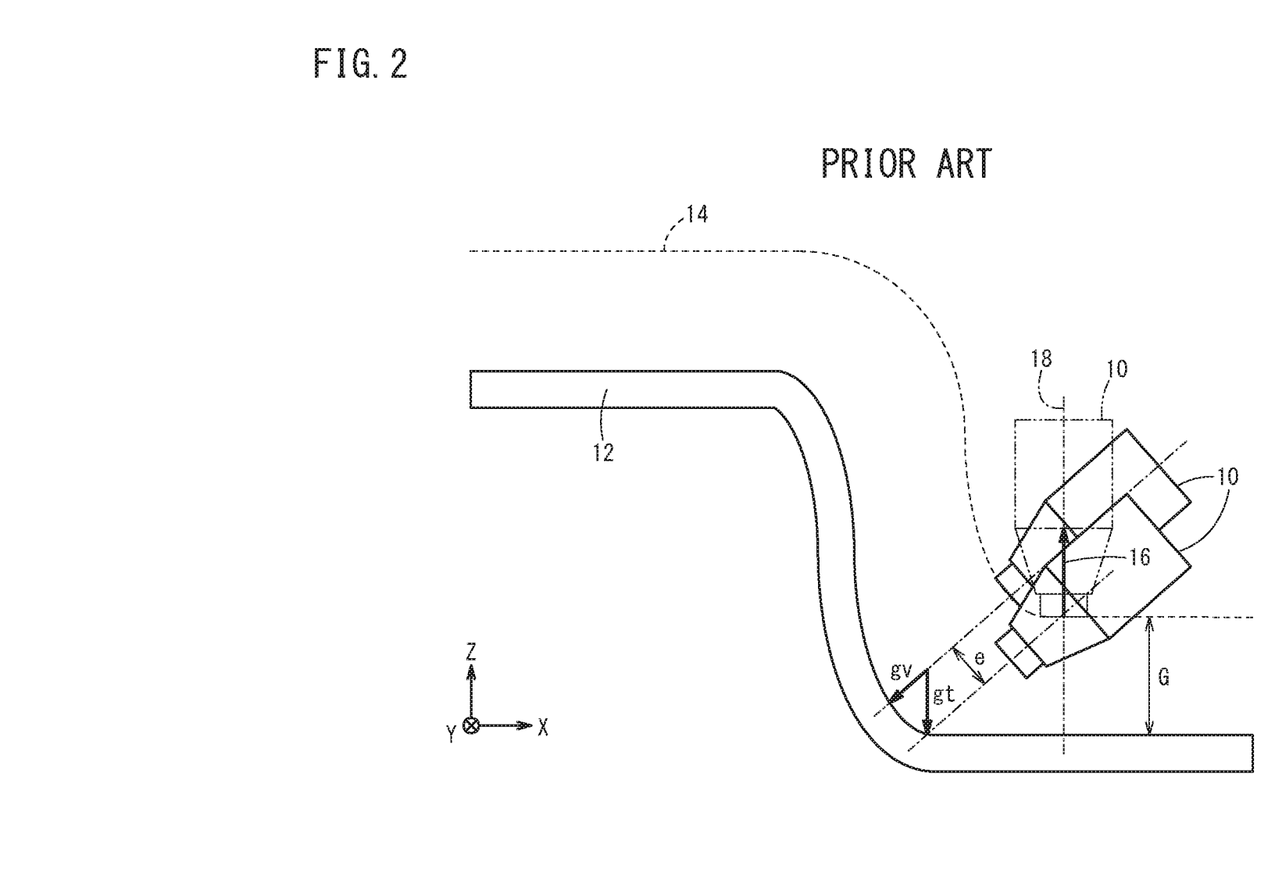
FIG. 2 is an explanatory diagram showing problems encountered in the present embodiment.

Prior to providing a description of the present embodiment, problems to be solved by the present embodiment will be described in detail with reference to FIGS. 1 and 2. FIGS. 1 and 2 are explanatory diagrams of conventional three-dimensional laser machining.

A machining nozzle 10 is a nozzle dedicated to performing three-dimensional laser machining. As shown by the dashed lines in FIGS. 1 and 2, a pathway 14 is set so as to be separated a predetermined distance from the surface of a workpiece 12 as a workpiece to be machined. The pathway 14 defines the path of a distal end of the machining nozzle 10, which is set on the basis of a predetermined machining program. In accordance with the machining program, the machining nozzle 10 is rotated about an axis of rotation (not shown) which is parallel to the Y-direction, while being three-dimensionally moved relatively to the workpiece 12, and a laser beam is irradiated toward the surface of the workpiece 12 from the distal end of the machining nozzle 10, thereby carrying out laser machining on the workpiece 12.

In this case, while the distance between the distal end of the machining nozzle 10 and the surface of the workpiece 12 is maintained at a constant gap amount G, the machining nozzle 10 is moved relatively in three-dimensional directions along the pathway 14 with respect to the workpiece 12. More specifically, a control of the gap amount G, as described below, has conventionally been performed.

Initially, on the basis of the machining program, a command value (command position) of the position and posture of the machining nozzle 10 is obtained, and a unit vector 16 in the axial direction of the machining nozzle 10 at the determined command position is calculated. In this instance, when the machining nozzle 10 is rotated about the axis of rotation, the posture of the machining nozzle 10 changes. More specifically, when the machining nozzle 10 is rotated about the axis of rotation, the posture of the machining nozzle 10 varies depending on the angle of rotation of the machining nozzle 10. Further, the position of the machining nozzle 10 is defined by an arbitrary position of the machining nozzle 10 in a three-dimensional space (for example, a center of gravity position or the distal end position of the machining nozzle 10). Consequently, when the machining nozzle 10 is moved three-dimensionally with respect to the workpiece 12, the position of the machining nozzle 10 also changes. Furthermore, the command position includes both a target position and a target posture of the machining nozzle 10, as calculated based on the machining program, and is shown by the two-dot-dashed line in FIGS. 1 and 2. Further still, the axial direction of the machining nozzle 10 is defined by a direction along the central axis 18 of the machining nozzle 10. Further, the unit vector 16 refers to a unit vector in a direction along the central axis 18.

Next, by multiplying the unit vector 16 by an amount of change gv in the gap amount G, a corrected movement amount (vector) gt of the machining nozzle 10 is determined in order to maintain the gap amount G constant. Moreover, the amount of change gv in the gap amount G is a difference between (the gap amount G corresponding to) a former position of the machining nozzle 10, and (the gap amount G corresponding to) a current position of the machining nozzle 10.

In addition, by causing the machining nozzle 10 to move relatively to the surface of the workpiece 12 by the corrected movement amount gt in the direction of the unit vector 16, the gap amount G is maintained at a constant value.

Incidentally, in the case that the machining nozzle 10 is turned along the surface of the workpiece 12, if a delay in the servo control takes place, then, as shown in FIG. 1, a deviation occurs between the command position (shown by the two-dot-dashed line) and the actual position and posture (shown by the solid line) of the machining nozzle 10.

In this condition, in the case that the gap amount G is controlled to remain constant, the unit vector 16 of the machining nozzle 10 at the command position is determined, the corrected movement amount (vector) gt of the machining nozzle 10 is determined using the amount of change gv in the gap amount G and the determined unit vector 16, and on the basis of the determined corrected movement amount gt, the machining nozzle 10 is moved relatively with respect to the workpiece 12. Consequently, as shown in FIG. 2, the machining nozzle 10 moves relatively along the axial direction (Z direction) of the machining nozzle 10 at the command position. More specifically, the machining nozzle 10 moves relatively along the Z direction, which is different from the actual axial direction (inclined direction) of the machining nozzle 10.

As a result, together with it being difficult to control the gap amount G to remain constant, an error e is generated between the position prior to movement and the position after movement of the machining nozzle 10. In this condition, when laser machining is carried out by irradiating a laser beam onto the surface of the workpiece 12 from the distal end of the machining nozzle 10, an error occurs between the target machined shape and the actual machined shape of the workpiece 12, and thus, machining accuracy decreases. In this case, the error e becomes an error in the machined shape of the workpiece 12.

Method for Solving the Problems According to the Present Embodiment

Thus, according to the present embodiment, in order to solve the problems described above, the gap amount G is controlled in the following manner.

Figure 3:
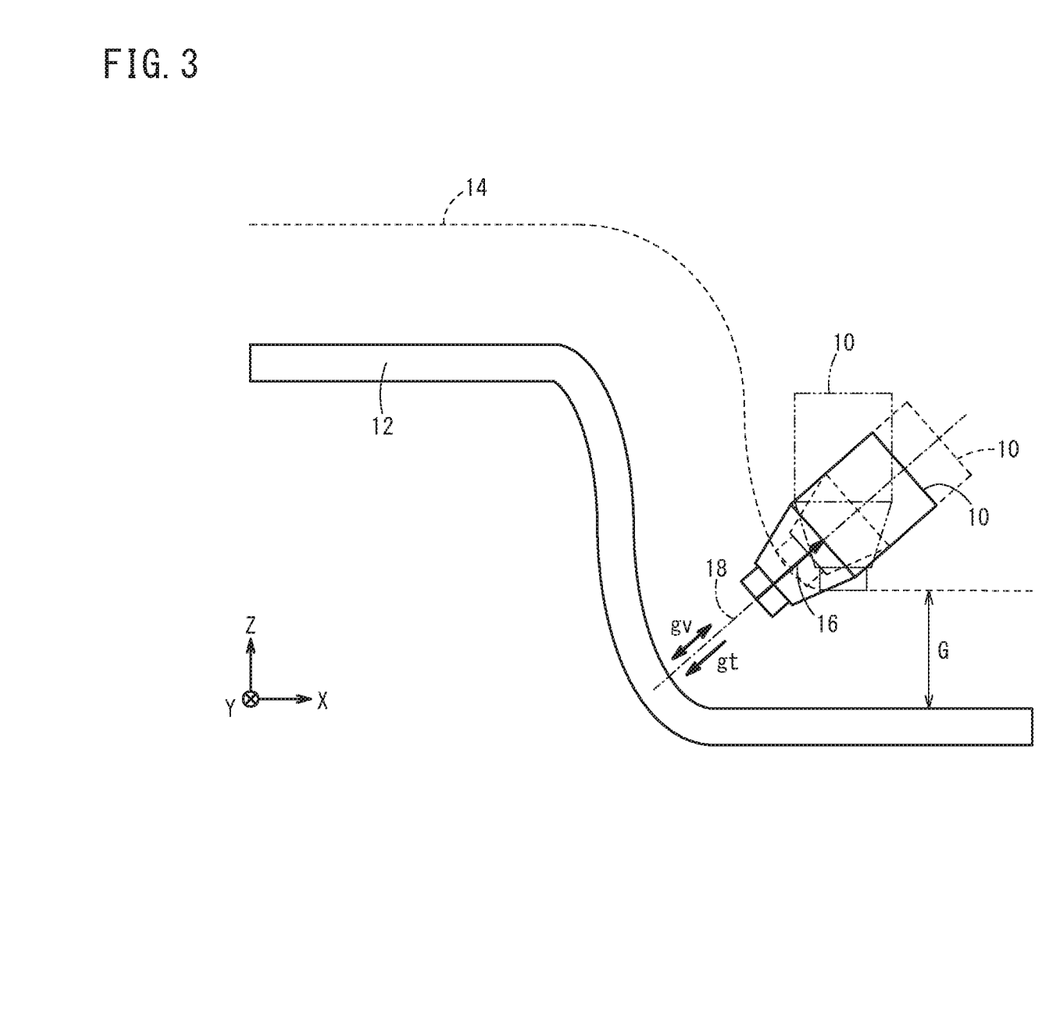
FIG. 3 is an explanatory diagram showing a method of solving the problems according to the present embodiment.

As shown in FIG. 3, according to the present embodiment, instead of the method of calculating the unit vector 16 at the command position (see FIG. 2), a unit vector 16 along the central axis 18 of the actual machining nozzle 10 is calculated. In addition, the corrected movement amount (vector) gt of the machining nozzle 10 is determined by multiplying the determined unit vector 16 by the amount of change gv in the gap amount G, and the machining nozzle 10 is moved relatively on the basis of the determined corrected movement amount gt. Owing thereto, the machining nozzle 10 can be moved relatively along the actual axial direction (the direction of the central axis 18) of the machining nozzle 10. As a result, even in the case that a delay occurs in the servo control, together with enabling the gap amount G to be controlled at a constant value along the actual central axis 18 of the machining nozzle 10, it is possible to reduce the error e in the machined shape of the workpiece 12. In FIG. 3, the dashed line indicating the machining nozzle 10 shows the position of the machining nozzle 10 prior to movement thereof, whereas the solid line indicating the machining nozzle 10 shows the position of the machining nozzle 10 after movement thereof.

Configuration of the Present Embodiment

Next, a description will be made with reference to FIG. 4 concerning the configuration of the laser machining device 20 according to the present embodiment, which is used in order to implement the aforementioned method of solving.

The laser machining device 20 is constituted to include a numerical controller (CNC), an NC control unit (command control unit) 22, and a servo control unit 24.

In accordance with a predetermined machining program 26, the NC control unit 22 outputs a movement amount command value (command movement amount) for three-dimensionally moving the machining nozzle 10 relatively to the workpiece 12, and rotational amount command values (command rotational amounts) for rotating the machining nozzle 10 about an A-axis 28a and a B-axis 28b (axes of rotation). The A-axis 28a is an axis of rotation which is substantially perpendicular to the B-axis 28b and rotatably supports the B-axis 28b. Further, the B-axis 28b is an axis of rotation which is substantially perpendicular to the central axis 18 of the machining nozzle 10 and rotatably supports the machining nozzle 10.

On the basis of the command movement amount, the servo control unit 24 controls an X-axis motor 30x, a Y-axis motor 30y, and a Z-axis motor 30z (three-dimensional moving units), whereby the servo control unit 24 moves the machining nozzle 10 in three-dimensional directions (X-direction, Y-direction, Z-direction) with respect to the workpiece 12. Further, based on the command rotational amounts, the servo control unit 24 controls an A-axis motor 30a (rotating unit), whereby the B-axis 28b and the machining nozzle 10 are rotated about the A-axis 28a, whereas the servo control unit 24 controls a B-axis motor 30b (rotating unit), whereby the machining nozzle 10 is rotated about the B-axis 28b.

The internal configurations of the NC control unit 22 and the servo control unit 24 will now be described in greater detail.

The NC control unit 22 includes a machining path command analyzing unit 34, an interpolation processing unit 36, a coordinate value update processing unit 38, and a command output unit 40. The machining path command analyzing unit 34 analyzes the content of the machining program 26 for the workpiece 12, which is stored in a non-illustrated storage device. Consequently, the machining path command analyzing unit 34 specifies a movement position (coordinate position) for the machining nozzle 10 that makes up the pathway 14 of the distal end of the machining nozzle 10 with respect to the surface of the workpiece 12. The interpolation processing unit 36 creates the pathway 14 by carrying out an interpolation process for connecting each of the movement positions.

Based on the current position of the machining nozzle 10 corresponding to the respective rotational positions of the A-axis motor 30a, the B-axis motor 30b, the X-axis motor 30x, the Y-axis motor 30y, and the Z-axis motor 30z, the coordinate value update processing unit 38 performs an updating process to correct the set coordinate position of the pathway 14 to a position corresponding to the actual position of the machining nozzle 10.

On the basis of the set pathway 14, the command output unit 40 determines the command movement amount in three-dimensional directions of the machining nozzle 10, together with the command rotational amounts around the A-axis 28a and around the B-axis 28b, and outputs the determined command movement amount and command rotational amounts to the servo control unit 24.

The servo control unit 24 includes a position control processing unit 42, a speed control processing unit 44, and a current control processing unit 46. In the case that the machining nozzle 10 is moved along the pathway 14, based on the command movement amount, the position control processing unit 42 sets a target position for relatively moving the machining nozzle 10 in three-dimensional directions, and based on the command rotational amounts, sets target rotational positions for times when the machining nozzle 10 is rotated around the A-axis 28a and around the B-axis 28b.

The speed control processing unit 44 sets the rotational speeds of the X-axis motor 30x, the Y-axis motor 30y, and the Z-axis motor 30z in order to move the machining nozzle 10 relatively in three-dimensional directions up to the target position that has been set by the position control processing unit 42. Further, the speed control processing unit 44 sets the rotational speeds of the A-axis motor 30a and the B-axis motor 30b in order to rotate the A-axis 28a and the B-axis 28b up to the target rotational positions that have been set by the position control processing unit 42.

On the basis of the respective rotational speeds set by the speed control processing unit 44, the current control processing unit 46 generates current signals in order to control the A-axis motor 30a, the B-axis motor 30b, the X-axis motor 30x, the Y-axis motor 30y, and the Z-axis motor 30z. The respective generated current signals, after having been amplified by the servo amplifiers 48a, 48b, 48x, 48y, 48z, are supplied to the A-axis motor 30a, the B-axis motor 30b, the X-axis motor 30x, the Y-axis motor 30y, and the Z-axis motor 30z.

Consequently, on the basis of the command movement amount, the X-axis motor 30x, the Y-axis motor 30y, and the Z-axis motor 30z are driven, whereby the machining nozzle 10 can be moved three-dimensionally relative to the surface of the workpiece 12. Further, by driving the A-axis motor 30a and the B-axis motor 30b based on the command rotational amounts, the machining nozzle 10 can be rotated about the A-axis 28a and the B-axis 28b.

In addition, in order to control the gap amount G to remain constant when laser machining is performed with respect to the workpiece 12, the laser machining device 20 is further equipped with the following configuration.

The laser machining device 20 is further equipped with a gap amount detecting unit 50 disposed in the vicinity of the machining nozzle 10, a rotational position detecting unit 52a attached to the A-axis motor 30a, and a rotational position detecting unit 52b attached to the B-axis motor 30b.

The gap amount detecting unit 50 detects the gap amount G between the surface of the workpiece 12 and the distal end of the machining nozzle 10 in a direction along the central axis 18 of the machining nozzle 10. An analog signal corresponding to the detected gap amount G is A/D converted by an A/D converter 54, and then is output to the servo control unit 24. The rotational position detecting unit 52a is an absolute type rotary encoder, which outputs to the servo control unit 24 an output signal corresponding to the rotational position of the A-axis motor 30a. The rotational position detecting unit 52b is an absolute type rotary encoder, which outputs to the servo control unit 24 an output signal corresponding to the rotational position of the B-axis motor 30b. More specifically, the rotational position detecting units 52a, 52b detect absolute positions of angles of rotation of the A-axis motor 30a and the B-axis motor 30b, and output signals indicative of the detected absolute positions are output to the servo control unit 24.

Further, the laser machining device 20 is additionally equipped with a rotational position calculating unit 56, a unit vector calculating unit 58, a movement command calculating unit 62, a speed command calculating unit 64, and a torque command calculating unit 66. These constituent elements are provided in the servo control unit 24.

On the basis of the respective output signals input thereto from the rotational position detecting units 52a, 52b, the rotational position calculating unit 56 calculates the current rotational positions of the A-axis 28a and the B-axis 28b.

On the basis of each of the current rotational positions of the A-axis 28a and the B-axis 28b calculated by the rotational position calculating unit 56, the unit vector calculating unit 58 calculates the unit vector 16 in a direction along the actual central axis 18 of the machining nozzle 10.

On the basis of the unit vector 16 calculated by the unit vector calculating unit 58, and the gap amount G detected by the gap amount detecting unit 50, the movement command calculating unit 62 determines a corrected movement amount (vector) gt of the machining nozzle 10, and outputs to the position control processing unit 42 a command signal corresponding to the determined corrected movement amount gt. More specifically, the movement command calculating unit 62 multiplies the unit vector 16 by the amount of change gv in the gap amount G (the difference between the former distal end position of the machining nozzle 10 and the current distal end position of the machining nozzle 10), whereby the corrected movement amount (vector) gt is determined, and a command signal corresponding to the determined corrected movement amount gt is output to the position control processing unit 42.

Consequently, the position control processing unit 42 corrects the command movement amount that is input from the command output unit 40 with the corrected movement amount gt that is supplied from the movement command calculating unit 62. In addition, the position control processing unit 42 sets the target position based on the command movement amount after correction thereof. As a result, the target position based on the initial command movement amount is corrected, and the corrected target position is output to the speed control processing unit 44.

As a result, the speed control processing unit 44 sets the rotational speeds of the X-axis motor 30x, the Y-axis motor 30y, and the Z-axis motor 30z based on the target position after correction thereof. Further, on the basis of the respective rotational speeds that reflect the target position after correction thereof, the current control processing unit 46 generates current signals to be supplied to the X-axis motor 30x, the Y-axis motor 30y, and the Z-axis motor 30z.

In the above description, an explanation was given concerning a case in which the corrected movement amount gt is output to the position control processing unit 42 from the movement command calculating unit 62, and the command movement amount input from the command output unit 40 is corrected. However, with the laser machining device 20, instead of correcting the command movement amount, it also is possible to output command signals to the speed control processing unit 44 or the current control processing unit 46, and to directly correct the respective rotational speeds or the respective current signals.

In this instance, in the case of correcting the respective rotational speeds, the following processes are carried out in the servo control unit 24. Based on the corrected movement amount gt output from the movement command calculating unit 62, the speed command calculating unit 64 determines corrected values (corrected rotational speeds) of the respective rotational speeds for the X-axis motor 30x, the Y-axis motor 30y, and the Z-axis motor 30z corresponding to the corrected movement amount gt. The speed command calculating unit 64 outputs command signals responsive to each of the determined corrected rotational speeds to the speed control processing unit 44.

Consequently, in the speed control processing unit 44, the respective rotational speeds of the X-axis motor 30x, the Y-axis motor 30y, and the Z-axis motor 30z calculated on the basis of the target position from the position control processing unit 42 are corrected respectively with the corrected rotational speeds indicated by the command signals supplied from the speed command calculating unit 64, and the respective rotational speeds after correction thereof are output to the current control processing unit 46.

On the other hand, in the case of correcting the respective current signals, the following processes are carried out in the servo control unit 24. Based on the command signals output from the speed command calculating unit 64, the torque command calculating unit 66 determines corrected values (corrected torques) for the torques for the X-axis motor 30x, the Y-axis motor 30y, and the Z-axis motor 30z corresponding to the respective corrected rotational speeds. The torque command calculating unit 66 outputs command signals responsive to each of the determined corrected torques to the current control processing unit 46.

Consequently, in the current control processing unit 46, the respective current signals supplied to the X-axis motor 30x, the Y-axis motor 30y, and the Z-axis motor 30z and calculated based on the respective rotational speeds from the speed control processing unit 44 are corrected based on the corrected torques supplied from the torque command calculating unit 66, and the respective current signals after correction thereof are output to the servo amplifiers 48x, 48y, 48z.

In this manner, with the laser machining device 20, the command signals output from the movement command calculating unit 62, the speed command calculating unit 64, or the torque command calculating unit 66 (the corrected movement amount gt, the corrected rotational speeds, or the corrected torques) can be output to the position control processing unit 42, the speed control processing unit 44, or the current control processing unit 46, and the command movement amount, the respective rotational speeds, or the respective current signals can be selectively corrected. Consequently, on the basis of the respective current signals after correction thereof, the X-axis motor 30x, the Y-axis motor 30y, and the Z-axis motor 30z are driven, such that when the machining nozzle 10 is moved relatively with respect to the surface of the workpiece 12, the gap amount G can be controlled to remain at a constant value.

Operations of the Present Embodiment

Next, a description will be made with reference to FIGS. 5 through 8 concerning operations (laser machining method) of the laser machining device 20 according to the present embodiment. In this description, explanations may also be made as necessary with reference to FIGS. 1 through 4.

In this instance, a case will be described in which the machining nozzle 10 is turned along the pathway 14 while maintaining the predetermined gap amount G along a substantially arcuate surface of the workpiece 12, and laser machining is carried out with respect to the workpiece 12 by irradiating the laser beam onto the workpiece 12 from the machining nozzle 10.

Figure 5:
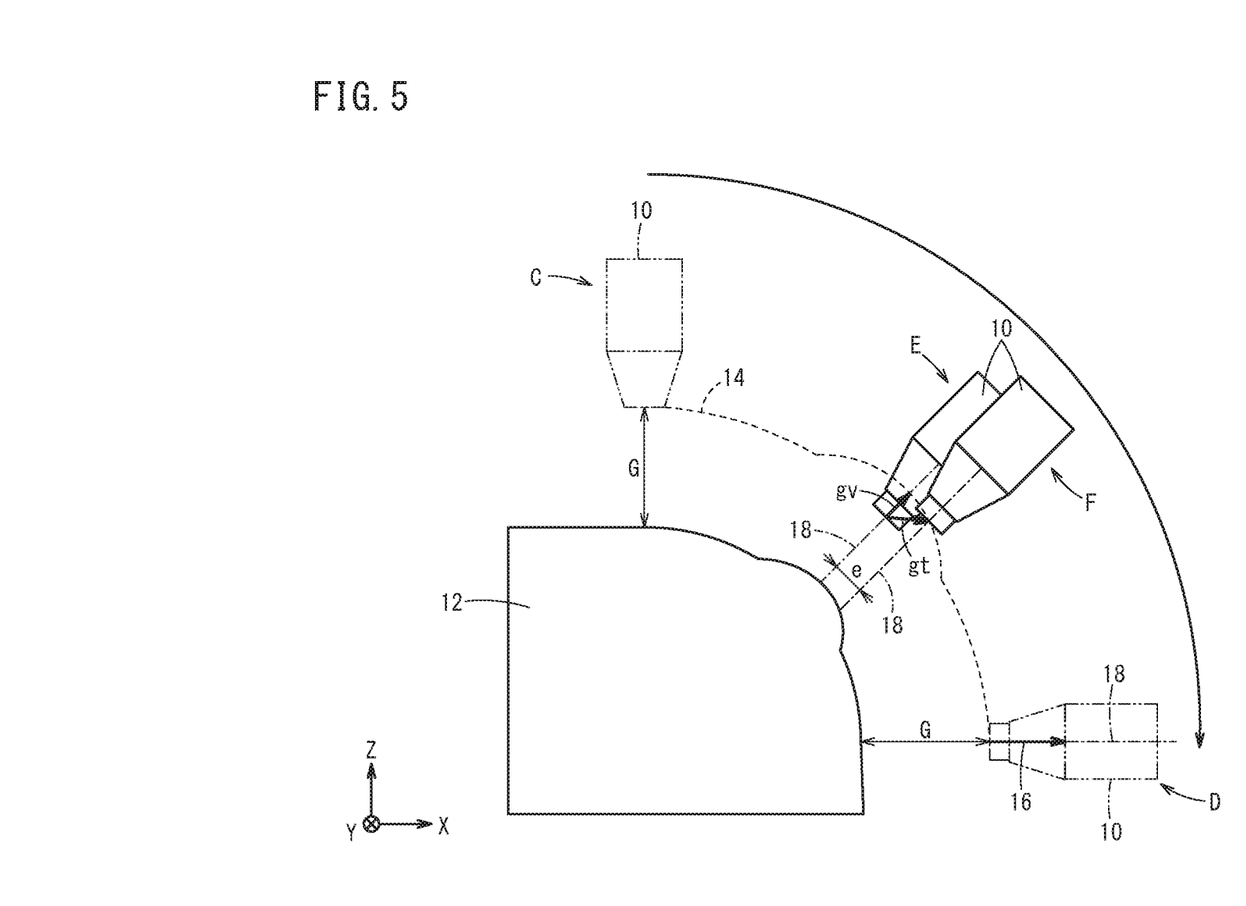
FIG. 5 is an explanatory diagram of a comparative example.
Figure 6:
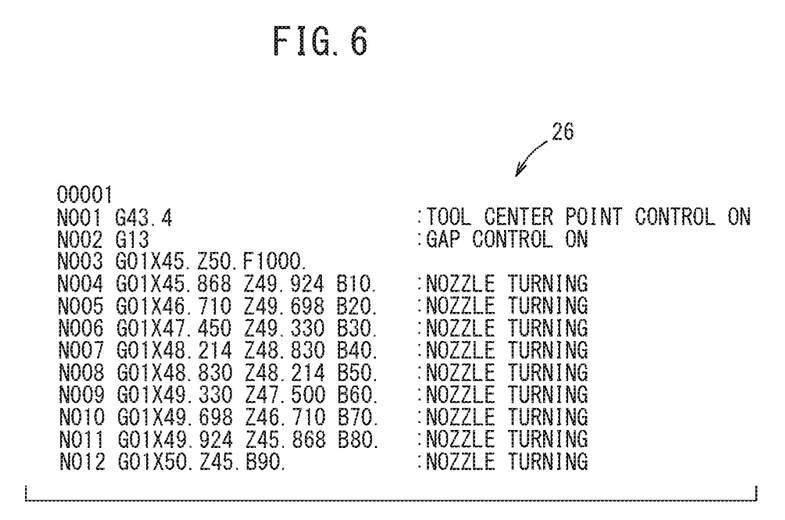
FIG. 6 is an explanatory diagram of a machining program.

FIG. 5 is an explanatory diagram of laser machining according to a comparative example. Further, FIG. 6 is an explanatory diagram of the machining program 26. The machining program 26 shown in FIG. 6 is executed both in a comparative example, as well as in an example of execution in which the laser machining device 20 according to the present embodiment is operated.

Figure 4:
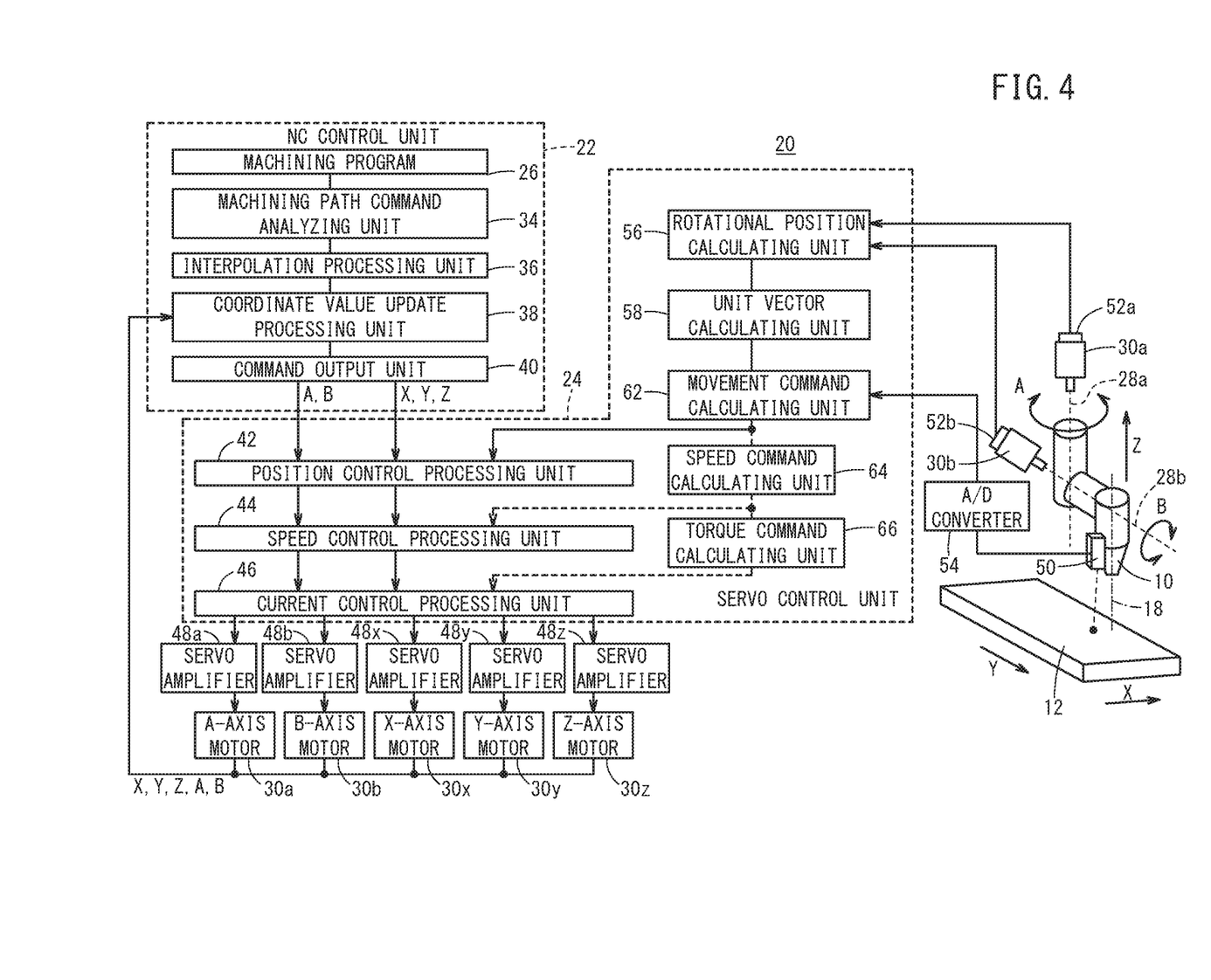
FIG. 4 is a block diagram of a laser machining device according to the present embodiment.

In the comparative example, operations are performed in relation to a laser machining device that is not equipped with the rotational position detecting units 52a, 52b, the rotational position calculating unit 56, the unit vector calculating unit 58, the movement command calculating unit 62, the speed command calculating unit 64, or the torque command calculating unit 66 shown in FIG. 4.

With laser machining according to the comparative example, in accordance with the machining program 26 of FIG. 6, the machining nozzle 10 is moved three-dimensionally with respect to the surface of the workpiece 12, and the machining nozzle 10 is rotated about the A-axis 28a and the B-axis 28b, whereby the machining nozzle 10 is turned and laser machining is carried out on the workpiece 12 while controlling the gap amount G to remain constant.

As shown in FIG. 5, in the event that the machining nozzle 10 is turned clockwise along the pathway 14 from an upper position C, at a time that the command position of the machining nozzle 10 based on the machining program 26 is at the D position, due to a control delay in the servo control unit 24, the actual position of the machining nozzle 10 is at the E position.

Therefore, in the comparative example, the unit vector 16 at the D position is multiplied by the amount of change gv in the gap amount G at the E position to thereby obtain the corrected movement amount gt. The corrected movement amount gt is a movement amount along the direction (X-direction) of the unit vector 16 at the D position, and is a corrected movement amount in a direction that differs from the central axis 18 of the machining nozzle 10 at the E position.

Consequently, when the machining nozzle 10 is three-dimensionally moved in accordance with the corrected movement amount gt relatively to the surface of the workpiece 12, the machining nozzle 10 moves to the F position, which is displaced by the corrected movement amount gt in the X-direction from the E position. As a result, an error e in relation to movement of the machining nozzle 10 is generated between the E position and the F position. Therefore, when the laser beam is irradiated onto the surface of the workpiece 12 from the machining nozzle 10 that has been moved to the F position, a contour error occurs in the workpiece 12 after laser machining thereof.

Figure 7:
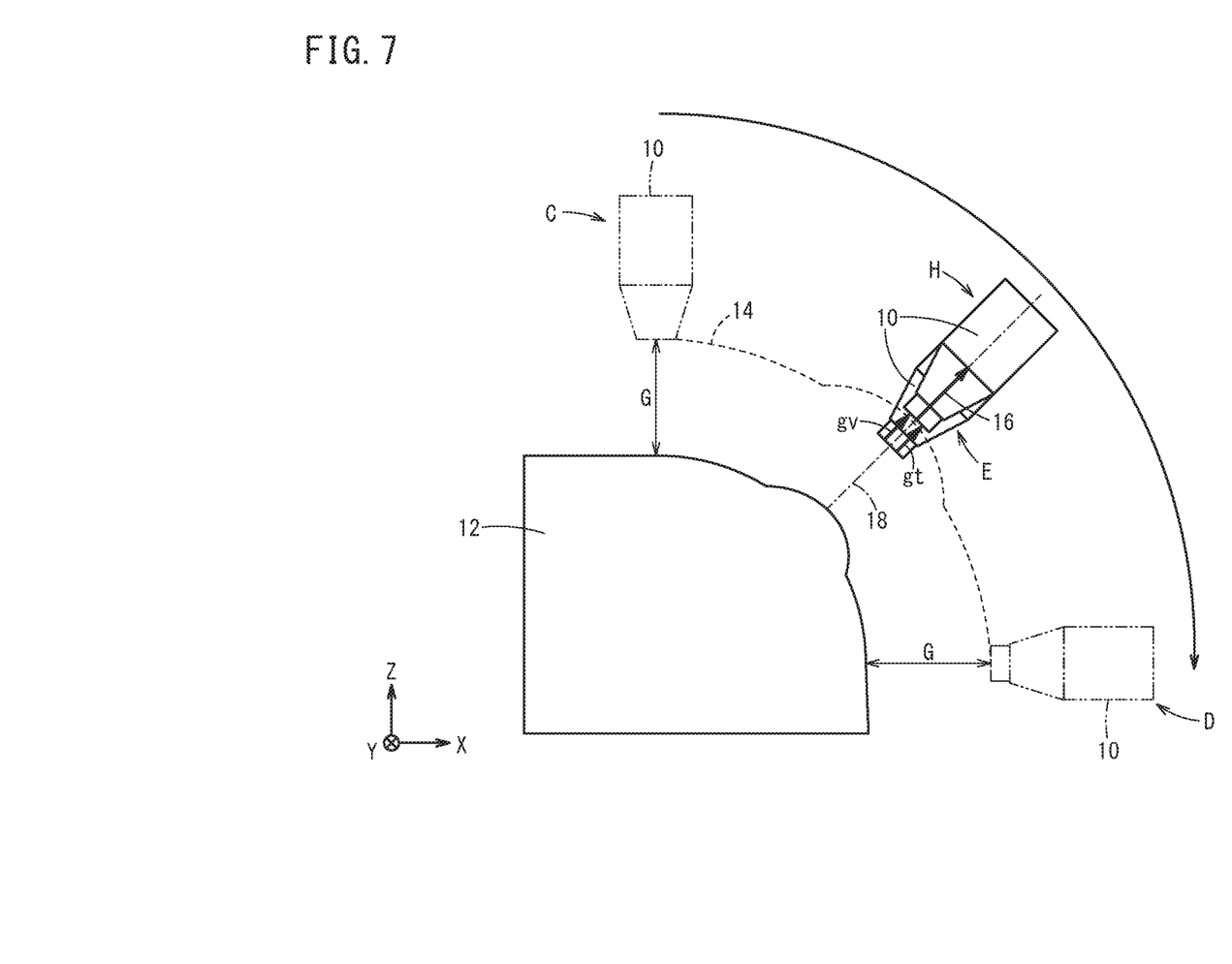
FIG. 7 is an explanatory diagram of an example of execution.
Figure 8:
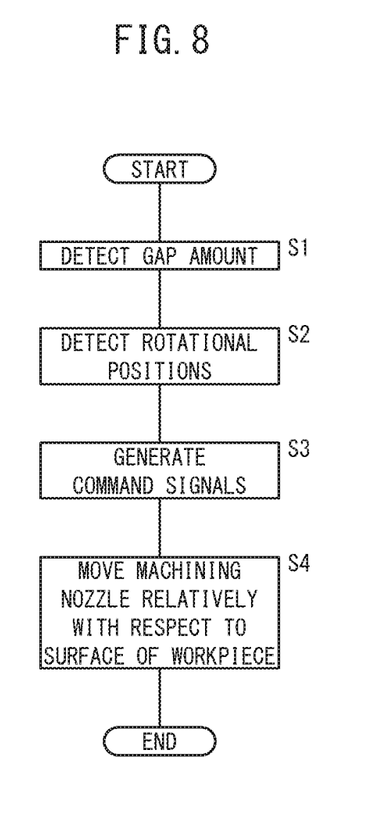
FIG. 8 is a flowchart of the example of execution.

In contrast thereto, in the example of execution shown in FIGS. 7 and 8, with the laser machining device 20 according to the present embodiment, when step S1 (first step) of FIG. 8 is executed, the gap amount G between the actual distal end of the machining nozzle 10 and the surface of the workpiece 12 is detected by the gap amount detecting unit 50, and the detected gap amount G is output to the movement command calculating unit 62 of the servo control unit 24.

Further, when step S2 (second step) is executed, the respective rotational positions around the A-axis 28a and around the B-axis 28b are detected respectively by the rotational position detecting units 52a, 52b, and output signal of each of the detected rotational positions is output to the rotational position calculating unit 56. On the basis of the respective output signals from the rotational position detecting units 52a, 52b, the rotational position calculating unit 56 calculates each of the current rotational positions of the A-axis 28a and the B-axis 28b (respective rotational positions at the E position shown in FIG. 7). Further, on the basis of each of the current rotational positions of the A-axis 28a and the B-axis 28b, the unit vector calculating unit 58 calculates the unit vector 16 in a direction along the central axis 18 of the machining nozzle 10 at the E position.

Consequently, when step S3 (third step) is executed, on the basis of the unit vector 16 and the gap amount G (amount of change gv) at the E position, the movement command calculating unit 62 determines the corrected movement amount gt of the machining nozzle 10, and outputs a command signal corresponding to the determined corrected movement amount gt. The position control processing unit 42 corrects the command movement amount with the corrected movement amount gt output from the movement command calculating unit 62, and sets the target position based on the corrected command movement amount. The speed control processing unit 44 outputs the respective rotational speeds in which the target position after correction thereof is reflected, and the current control processing unit 46 outputs the respective current signals in which the target position after correction thereof is reflected. The respective current signals are amplified by the servo amplifiers 48x, 48y, 48z, and are supplied to the X-axis motor 30x, the Y-axis motor 30y, and the Z-axis motor 30z.

As a result, when step S4 (fourth step) is executed, the machining nozzle 10 is moved relatively in three-dimensional directions with respect to the workpiece 12, and in a direction along the unit vector 16 (central axis 18) at the E position to the H position, which is more distanced from the surface than the E position. Accordingly, in the example of execution shown in FIGS. 7 and 8, even if a control delay occurs in the servo control unit 24, the command movement amount is corrected using the corrected movement amount gt (command signal) based on the actual gap amount G and the rotational positions, and the target position can be set on the basis of the command movement amount after correction thereof. Consequently, while suppressing the influence of the control delay in the servo control unit 24, and while the gap amount G is maintained at a constant value, it is possible to prevent the occurrence of a contour error (error e) on the surface of the workpiece 12 due to laser machining.

Moreover, as has been noted previously, in accordance with the laser machining device 20, it is possible for the speed command calculating unit 64 to output command signals responsive to the corrected rotational speeds, or for the torque command calculating unit 66 to output command signals responsive to the corrected torques. Consequently, instead of correcting the command movement amount by the position control processing unit 42, even in the case that a correction process to correct the respective rotational speeds is carried out in the speed control processing unit 44, or a correction process to correct the respective current signals is carried out in the current control processing unit 46, it also is possible to prevent the occurrence of the error e, while the gap amount G is maintained at a constant value.

Advantages and Effects of the Present Embodiment

As has been described above, in accordance with the laser machining device 20 and the laser machining method according to the present embodiment, the actual rotational positions around the A-axis 28a and the B-axis 28b, and the actual gap amount G are detected, respectively, the command signal is generated based on the detected rotational positions and the detected gap amount G, and then, on the basis of the generated command signal, the machining nozzle 10 is moved relatively in three-dimensional directions (X-direction, Y-direction, Z-direction) with respect to the workpiece 12. Consequently, even if a control delay occurs with respect to changes in the position and posture of the machining nozzle 10, it is possible to correctly control the gap amount G to remain constant. As a result, it is possible to reduce the error e in the machined shape of the workpiece 12 caused by controlling the gap amount G.

Further, based on the rotational position, the unit vector 16 in the direction of the central axis 18 of the machining nozzle 10 is calculated by the unit vector calculating unit 58, and the movement command calculating unit 62, the speed command calculating unit 64, or the torque command calculating unit 66 generates the command signal according to the corrected movement amount gt determined from the unit vector 16 and the gap amount G. Consequently, the machining nozzle 10 can be three-dimensionally moved relatively with respect to the workpiece 12 along the actual central axis 18 of the machining nozzle 10, and it is possible to correctly control the gap amount G.

Further, since the rotational position detecting units 52a, 52b are absolute type rotary encoders, they are capable of outputting output signals which are indicative of absolute positions of the rotational positions thereof. Consequently, assuming that in the rotational position calculating unit 56, the current rotational positions are calculated on the basis of the output signals, and in the unit vector calculating unit 58, the unit vector 16 is calculated on the basis of the calculated current rotational positions, the corrected movement amount gt can be determined accurately.

Further, in the servo control unit 24, the command movement amount, the respective rotational speeds, or the respective current signals are corrected using the command signals, and the X-axis motor 30x, the Y-axis motor 30y, and the Z-axis motor 30z are controlled based on the target position, the respective rotational speeds, or the respective current signals, which are based on the command movement amount after correction thereof. Consequently, it is possible to reduce any deviation between the command position and the actual position and posture of the machining nozzle 10 caused by a delay in the servo control. Further, because the target position, the respective rotational speeds, or the respective current signals are quickly corrected, and the gap amount G can be controlled so as to remain constant, it is possible to increase the rotational speeds of the A-axis 28a and the B-axis 28b, as well as to improve the cycle time of such laser machining.

The present invention is not limited to the embodiments described above, and it goes without saying that various modified or additional configurations could be adopted therein without departing from the essential scope and gist of the present invention.

In the above description, a case has been described in which the rotational position detecting units 52a, 52b are absolute type rotary encoders, however, they may also be incremental type rotary encoders. In this case, since pulse signals indicative of the rotational positions are output to the rotational position calculating unit 56 from the rotational position detecting units 52a, 52b, based on comparisons between the original point position and the pulse signals, the rotational position calculation unit 56 can calculate the current rotational positions around the A-axis 28a and around the B-axis 28b.

Further, according to the above description, although the servo control unit 24 is equipped with the rotational position calculating unit 56, the unit vector calculating unit 58, the movement command calculating unit 62, the speed command calculating unit 64, and the torque command calculating unit 66, such constituent elements may be disposed externally of the servo control unit 24. In this case as well, the command signal is supplied to the servo control unit 24 from the movement command calculating unit 62, the speed command calculating unit 64, or the torque command calculating unit 66, whereby correction process can be performed in the interior of the servo control unit 24 with respect to the command movement amount (target position), the respective rotational speeds, or the respective current signals, and therefore, the influence on control of the gap amount G due to a delay in the servo control can be minimized.

Furthermore, in the above description, a case has been described in which the gap amount G detected by the gap amount detecting unit 50 is output to the movement command calculating unit 62. However, the distal end position of the machining nozzle 10 may be calculated from the gap amount G, and the calculated distal end position may be output to the movement command calculating unit 62. In this case as well, the movement command calculating unit 62 can calculate the amount of change gv in the gap amount G from the input distal end position, and can calculate a corrected movement amount gt on the basis of the calculated amount of change gv and the unit vector 16.

What is claimed is:

1. A laser machining device in which, in accordance with a machining program, a machining nozzle is moved relatively with respect to a workpiece, the machining nozzle is rotated about a predetermined axis of rotation, and laser machining is performed on the workpiece by a laser beam irradiated from the machining nozzle, the laser machining device comprising:
   a first axis motor configured to relatively move the machining nozzle in three-dimensional directions with respect to the workpiece;
   a second axis motor configured to rotate the machining nozzle about the axis of rotation;
   a gap sensor attached to the machining nozzle and configured to detect, while the machining nozzle is rotated, a gap amount between the machining nozzle and the workpiece;
   a rotary encoder attached to the second axis motor and configured to detect, when the gap amount is being detected, a rotational position of the machining nozzle about the axis of rotation by the second axis motor; and
   a processor configured to generate a command signal for maintaining the gap amount at a constant value based on
   (1) the detected gap amount, and
   (2) the rotational position, detected by the rotary encoder when the gap amount is detected;
   wherein the processor is further configured to
      determine a position of the machining nozzle based on a rotational position of the first axis motor and a rotational position of the second axis motor,
      calculate a unit vector in an axial direction of the machining nozzle based on the rotational position of the first axis motor and the rotational position of the second axis motor,
      determine a corrected movement amount of the machining nozzle along the axial direction, by multiplying the unit vector with an amount of change in the detected gap amount,
      generate the command signal according to the corrected movement amount, and
      control the first axis motor based on the position of the machining nozzle, the machining program, and the command signal, to relatively move the machining nozzle in three-dimensional directions with respect to the workpiece, and
   wherein the amount of change in the gap amount is a difference between a former position of a center of gravity of the machining nozzle and a current position of the center of gravity of the machining nozzle.

2. A laser machining method in which, in accordance with a machining program, a machining nozzle is moved relatively with respect to a workpiece by a first axis motor, the machining nozzle is rotated about a predetermined axis of rotation by a second axis motor, and laser machining is performed on the workpiece by a laser beam irradiated from the machining nozzle, the laser machining method comprising:
   detecting, by a gap sensor attached to the machining nozzle and while the machining nozzle is rotated, a gap amount between the machining nozzle and the workpiece;
   detecting, by a rotary encoder attached to the second axis motor and when the gap amount is being detected, a rotational position of the machining nozzle about the axis of rotation as rotated by the second axis motor;
   generating, by a processor, a command signal for maintaining the gap amount at a constant value based on
   (1) the detected gap amount, and
   (2) the rotational position, detected by the rotary encoder when the gap amount is detected;
   determining, by the processor, a position of the machining nozzle based on a rotational position of the first axis motor and a rotational position of the second axis motor; and
   controlling, by the processor, the first axis motor based on the position of the machining nozzle, the machining program, and the command signal, to relatively move, by the first axis motor, the machining nozzle in three-dimensional directions with respect to the workpiece,
   wherein the method further comprises:
   determining, by the processor, corrected rotational speeds of the first axis motor and the second axis motor corresponding to a corrected movement amount of the machining nozzle along an axial direction of the machining nozzle; and
   outputting the command signal responsive to each of the determined corrected rotational speeds for controlling rotational speeds of the first axis motor and the second axis motor.

3. The laser machining device according to claim 1, wherein:
    the rotary encoder is an absolute type rotary encoder configured to output an output signal corresponding to the rotational position, and
    the processor is further configured to
        calculate a current rotational position of the axis of rotation based on the output signal, and
        calculate the unit vector based on the current rotational position.

4. The laser machining device according to claim 1, wherein the processor is further configured to
    on basis of the machining program, output a command rotational amount of the axis of rotation,
    control the second axis motor based on the command rotational amount, and
    correct the command movement amount using the command signal, and control the first axis motor based on the command movement amount after correction thereof.

5. The laser machining method according to claim 2, further comprising:
    calculating, by the processor, a unit vector in the axial direction of the machining nozzle based on the rotational position, and on basis of the calculated unit vector and the gap amount, determining, by the processor, the corrected movement amount of the machining nozzle along the axial direction.

6. The laser machining method according to claim 5, wherein
    the corrected movement amount is determined by multiplying the unit vector by an amount of change in the detected gap amount.

7. The laser machining device according to claim 1, wherein the first axis motor is configured to move the machining nozzle relatively to a surface of the workpiece in accordance with the corrected movement amount and along the axial direction of the machining nozzle.

8. A laser machining method in which, in accordance with a machining program, a machining nozzle is moved relatively with respect to a workpiece by a first axis motor, the machining nozzle is rotated about a predetermined axis of rotation by a second axis motor, and laser machining is performed on the workpiece by a laser beam irradiated from the machining nozzle, the laser machining method comprising:
    detecting, by a gap sensor attached to the machining nozzle and while the machining nozzle is rotated, a gap amount between the machining nozzle and the workpiece;
    detecting, by a rotary encoder attached to the second axis motor and when the gap amount is being detected, a rotational position of the machining nozzle about the axis of rotation as rotated by the second axis motor;
    generating, by a processor, a command signal for maintaining the gap amount at a constant value based on
        (1) the detected gap amount, and
        (2) the rotational position, detected by the rotary encoder when the gap amount is detected;
    determining, by the processor, a position of the machining nozzle based on a rotational position of the first axis motor and a rotational position of the second axis motor; and
    controlling, by the processor, the first axis motor based on the position of the machining nozzle, the machining program, and the command signal, to relatively move, by the first axis motor, the machining nozzle in three-dimensional directions with respect to the workpiece,
wherein the method further comprises:
    determining, by the processor, corrected rotational speeds of the first axis motor and the second axis motor corresponding to a corrected movement amount of the machining nozzle along an axial direction of the machining nozzle;
    determining, by the processor, corrected torques for the first axis motor and the second axis motor corresponding to the corrected rotational speeds; and
    outputting the command signal responsive to each of the determined corrected torques for controlling rotational speeds of the first axis motor and the second axis motor.

* * * * *